United States Patent
Stone

(10) Patent No.: US 10,460,316 B2
(45) Date of Patent: Oct. 29, 2019

(54) TWO DEVICE AUTHENTICATION

(75) Inventor: Carl Stone, Campbell, CA (US)

(73) Assignee: PAYPAL, INC., San Jose, CA (US)

( * ) Notice: Subject to any disclaimer, the term of this patent is extended or adjusted under 35 U.S.C. 154(b) by 694 days.

(21) Appl. No.: 12/754,006

(22) Filed: Apr. 5, 2010

(65) Prior Publication Data

US 2011/0246363 A1 Oct. 6, 2011

(51) Int. Cl.
| G06Q 20/40 | (2012.01) |
| G06Q 20/02 | (2012.01) |
| G06Q 20/12 | (2012.01) |
| G06Q 20/32 | (2012.01) |
| G06Q 20/42 | (2012.01) |

(52) U.S. Cl.
CPC ........... G06Q 20/401 (2013.01); G06Q 20/02 (2013.01); G06Q 20/12 (2013.01); G06Q 20/327 (2013.01); G06Q 20/40 (2013.01); G06Q 20/425 (2013.01)

(58) Field of Classification Search
CPC ....... G06Q 40/02; G06Q 20/32; G06Q 20/401
USPC .......................................................... 705/35
See application file for complete search history.

(56) References Cited

U.S. PATENT DOCUMENTS

| 6,175,922 B1 | 1/2001 | Wang |
| 6,282,656 B1 | 8/2001 | Wang |
| 6,594,759 B1 | 7/2003 | Wang |
| 6,850,916 B1 | 2/2005 | Wang |
| 7,107,246 B2 | 9/2006 | Wang |
| 7,635,084 B2 | 12/2009 | Wang et al. |
| 8,045,961 B2 * | 10/2011 | Ayed et al. ................... 455/411 |
| 2002/0023215 A1 | 2/2002 | Wang et al. |
| 2003/0097444 A1 * | 5/2003 | Dutta et al. ................... 709/225 |
| 2003/0191721 A1 | 10/2003 | Fiammante |
| 2004/0019564 A1 | 1/2004 | Goldthwaite |
| 2005/0105734 A1 * | 5/2005 | Buer et al. ..................... 380/270 |
| 2005/0125301 A1 * | 6/2005 | Muni ..................... G06Q 30/06 705/23 |
| 2005/0268107 A1 * | 12/2005 | Harris et al. .................. 713/182 |
| 2006/0131390 A1 * | 6/2006 | Kim .............................. 235/380 |
| 2006/0206709 A1 * | 9/2006 | Labrou ................ G06Q 20/18 713/167 |
| 2007/0194123 A1 * | 8/2007 | Frantz ................. G06K 17/0022 235/462.45 |
| 2007/0226495 A1 | 9/2007 | Kim et al. |

(Continued)

OTHER PUBLICATIONS

Subramaniam, Sumathy et al., "Secured Authentication for Online Banking using Mobile Phones", International Journal of Advanced Research in Computer Science 1.4 International Journal of Advanced Research in Computer Science, Nov. 2010. (Year: 2010).*

*Primary Examiner* — Eric T Wong
(74) *Attorney, Agent, or Firm* — Haynes and Boone, LLP

(57) ABSTRACT

In one embodiment, a transaction is authenticated by a payment provider, as opposed to a merchant, using two user devices without the user having to enter information, such as an email or password. When the user is ready to make a purchase from a merchant site, a unique transaction ID is created by the payment provider. That transaction ID, along with data about the transaction, such as specific items and cost, is automatically sent to the payment provider through a second device linked to the purchasing device. The payment provider compares the identifier from the sending device, such as the phone number, and the transaction ID with information stored in its database. If there is a match, the transaction/user may be approved or authenticated.

18 Claims, 3 Drawing Sheets

(56) References Cited

U.S. PATENT DOCUMENTS

| | | | |
|---|---|---|---|
| 2007/0294528 A1 | 12/2007 | Shoji et al. | |
| 2008/0195409 A1* | 8/2008 | Shankland | G06F 17/30879 705/1.1 |
| 2008/0307515 A1* | 12/2008 | Drokov et al. | 726/7 |
| 2009/0090783 A1* | 4/2009 | Killian | G06Q 20/0855 235/492 |
| 2009/0112768 A1* | 4/2009 | Hammad et al. | 705/44 |
| 2009/0240626 A1 | 9/2009 | Hasson et al. | |
| 2009/0265776 A1* | 10/2009 | Baentsch | H04L 63/08 726/9 |
| 2009/0271211 A1* | 10/2009 | Hammad | 705/1 |
| 2010/0057623 A1 | 3/2010 | Kapur et al. | |
| 2010/0070759 A1* | 3/2010 | Leon Cobos | G06F 21/43 713/155 |

* cited by examiner

TWO DEVICE AUTHENTICATION

BACKGROUND

Field of the Invention

The present invention generally relates to on-line transactions, and in particular, to authenticating and completing transactions through a user device.

Related Art

More and more consumers are purchasing items and services over electronic networks, such as the Internet. Consumers routinely search for and purchase products and services from merchants and individuals alike. The transactions can take place directly between an on-line merchant or retailer and the consumer, where payment is typically made by entering credit card or other financial information. Transactions can also take place with the aid of an on-line payment provider, such as PayPal, Inc. of San Jose, Calif. Such payment providers can make transactions easier and safer for the parties. Purchasing through the Internet from the convenience of a consumer's home, office, or virtually anywhere (with mobile devices) is one main reason why on-line purchases are growing faster and faster.

On-line purchasing and other transactions, such as financial transactions involving movement of money over the Internet, have greatly increased, due in part to the ease of use by the consumer or user. In on-line payment transactions, multiple parties are frequently involved. For example, a user may use a portable device to access a merchant's website to make purchases and to request that payments for the purchases be transferred from the user's account with a payment provider such as PayPal to the merchant's account. To complete the purchase, the user needs to authorize the payment transaction with the payment provider. Authorization of the payment transaction may require the user to enter identification information such as a user ID (e.g., an email, username, or phone number) and a password or PIN that is known only to the user and the payment provider so that the payment provider may authenticate the user. However, to complete a transaction, the user may be required to enter such information to the merchant, a payment provider, or both. This may be burdensome, time-consuming, and inefficient, due at least in part to having to enter information and/or remember the requested information.

Thus, there is a need for a way that users or consumers can more easily authenticate a user and process a transaction without the disadvantages of the conventional methods above.

SUMMARY

In accordance with different embodiments, a system and method authenticates a user and/or processes a transaction using two user devices to transmit needed information. In one embodiment, when a user accesses a merchant site using a first device, such as a laptop, and is ready to pay for purchases, the user may select a payment button. At that time, a payment provider, such as PayPal, Inc. of San Jose, Calif., generates a transaction ID unique to the transaction, which includes details about the transaction, such as items and price. The transaction ID is transmitted back to the first user device, which then transmits the ID to a second user device, such as a smart phone, that is linked to the first device. The second device automatically sends the transaction ID and data to the payment provider.

The "link" between the two devices can be a communication link, such as via Bluetooth, 802.11, or other wired or wireless communication means. The two devices may also linked to the same user, e.g., both devices are registered to the same user. The transaction ID and any other information, such as the phone number of the second device, can be sent via SMS or other means through the phone. The payment provider then uses the phone number and the transaction ID information to authenticate the user. If authenticated, the payment may be processed.

Thus, the user does not need to enter any information, such as accessing the user's payment provider account, and it is safer because communication includes the unique transaction ID and is with the payment provider instead of the merchant.

In another embodiment, the process can be "reversed" so that authentication can be communicated through a laptop or other device. In this embodiment, the user makes the purchase through the user's phone or mobile device. The transaction ID is transmitted to the phone, which automatically conveys the ID to a second user device, such as a laptop or PC. The laptop then transmits the transaction ID and user/device information, such as the device ID or IP address, to the payment provider for authentication. If the transaction ID and user/device information is authenticated, the payment provider processes the transaction, such as transferring funds from a user account to a merchant account and notifying the merchant and/or user when the transfer or payment is completed.

These and other features and advantages of the present invention will be more readily apparent from the detailed description of the embodiments set forth below taken in conjunction with the accompanying drawings.

Figure 1:
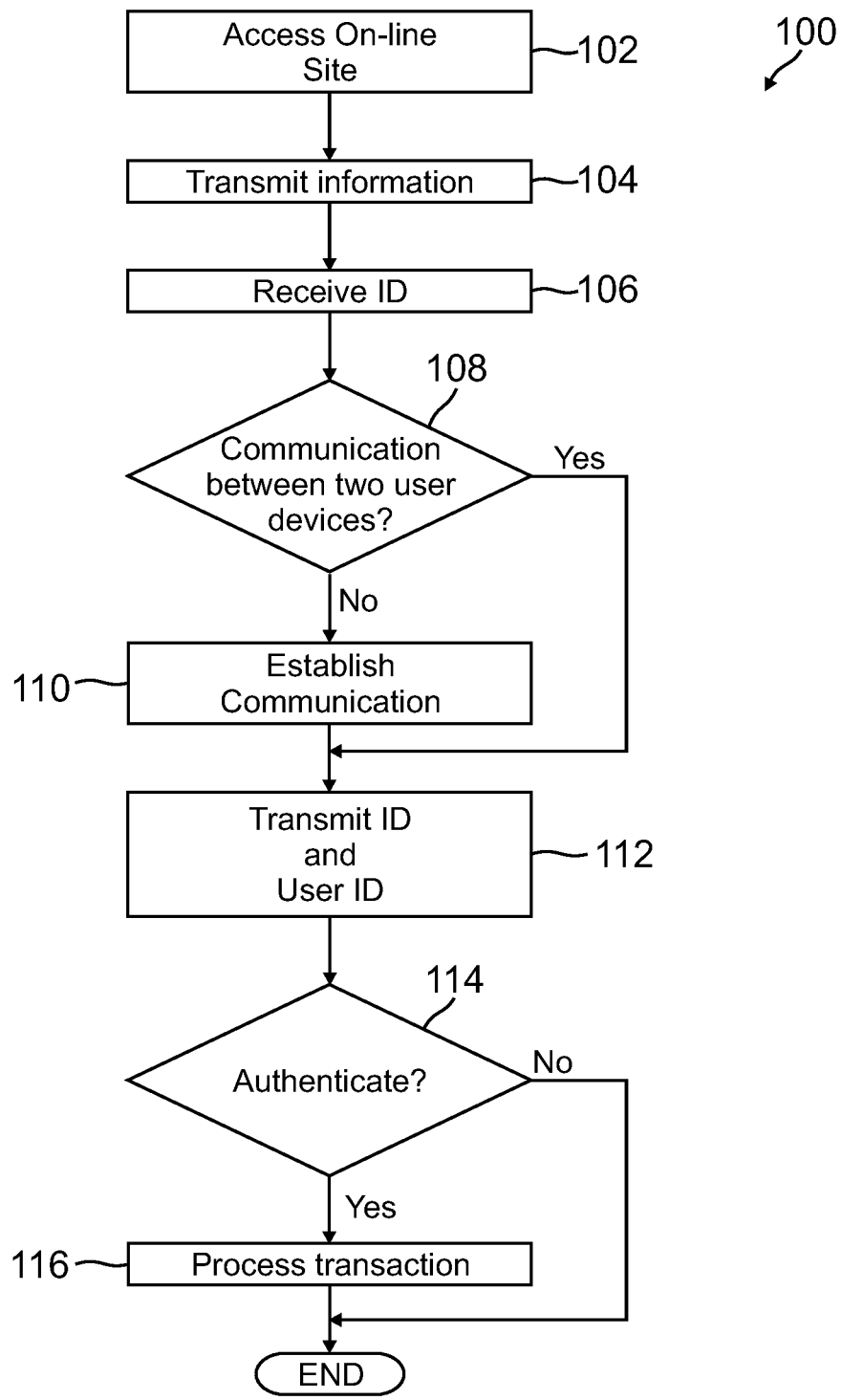
FIG. 1 is a flowchart showing a process for authenticating a user and/or transaction using two devices according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

FIG. 1 is a flowchart 100 showing a process for authenticating a user and/or transaction using two user devices, according to one embodiment. At step 102, the user accesses an on-line site, such as for a merchant, retailer, marketplace, financial institution, or any other site in which the user would be required to transmit payment or other information as described herein, via a first user device. The user device may be any device that allows the user to access an on-line or Internet site through a wireless or wired communication and receive content. Suitable devices include PCs, laptops, smart phones, PDAs, and the like. In this embodiment, the first user device is a PC or laptop. The first user device accesses the site by going to the desired site, such as through the URL of the site. For exemplary purposes, the desired site is an on-line retailer, although other types of sites may also be suitable.

Once on the site, the user, through the first user device, locates products and/or services offered by the site. The user selects desired products ("products" as used herein may also include services or digital goods) through the site. In a typical shopping experience, the user places desired products in a shopping cart until ready for checkout or payment. One way for the user to make the payment is through a payment provider, such as PayPal, Inc. of San Jose, Calif. A payment button or link may appear on the page when the user is ready to checkout or make a payment.

In conventional methods, the user clicks on the button, which directs the user to the payment provider site. The user may then be requested to enter information, such as a user identifier and a password. As discussed above, this can be cumbersome and inconvenient.

In the process of flowchart 100, when the user clicks on the payment button or otherwise makes a selection indicating the user is ready to pay or checkout, information about the transaction is transmitted, at step 104, to the payment provider. The information, in one embodiment, includes the total amount of the transaction and merchant information. Other information may include a description of each product, price of each product, number of products, shipping costs, taxes, etc.

Once the payment provider receives the transaction information, the payment provider generates a unique transaction identifier (ID). The transaction ID may be a series of numbers, letters, characters, and/or symbols, which is associated with the specific transaction. The payment provider stores the transaction ID and the corresponding transaction information received from the user through the merchant site.

Next, the payment provider transmits the transaction ID, which the user receives at step 106, on the first user device. In one embodiment, the transaction ID is visible to the user on a display of the first user device. In other embodiments, the transaction ID may be an audio file or completely invisible to the user. The transaction ID may be received in any number of ways, including visually on the merchant screen, by SMS or text, through an email, or a recorded audio file.

After the transaction ID is received by the user, a determination is made, at step 108, whether the first user device is in communication with a second user device. The second user device may include PCs, laptops, smart phones, PDAs, and the like. In this embodiment, the second user device is a smart phone. Communication between the two devices is such that information, such as the transaction ID, may be transmitted between the two devices. The communication may be by any suitable means, including Bluetooth, Radio Frequency (RF), Infrared (IR), microwave, Near Field Communication (NFC), RF Identification (RFID), Ultra Wideband, etc. The determination may be made with conventional ways for detecting whether two devices are in communication, which may depend on the type of communication. In one example, when a user logs onto a user's PC or laptop, the device may be able to automatically determine or discover which other user devices are paired with or in communication with the PC or laptop.

If there is no communication between the user devices, communication is established at step 110, which may be done in any number of ways depending on the reason why no communication was established and/or the type of communication. For example, the second device may simply need to be powered on or placed in closer proximity to the first user device, an access point, or a router. More complicated ways may include entering one or more device identifiers, initiating a discovery and pairing process, and configuring or reconfiguring one or both devices. Communication may automatically be established or attempted when the first and second user devices are within a sufficient distance or in close proximity to each other, such that one of the devices "recognizes" or "discovers" the other and communication is initiated.

Once communication is established, the transaction ID and a user or device identifier is communicated, at step 112, to the payment provider. In one embodiment, the communication is by the second user device. For example, the transaction ID is communicated from the first user device to the second user device. Once received, the second user device transmits the transaction ID, along with its own device or user ID, to the payment provider. The device or user ID is information that allows the payment provider to identify the user. Such information may include the telephone number or device ID of the second user device, which is transmitted automatically with the communication to the payment provider. Other device/user IDs may be transmitted by user input, such as the user entering a user name, email address, password, or any combination of identifiers into the second user device.

The transaction ID may be received by the second user device automatically from the first user device from the device pairing or communication. However, the transaction ID may also be received by other means, such as the user manually entering the transaction ID to the second user device. Transmission of the information, at step 112, may be accomplished through different methods. In one embodiment, the user enters the transaction ID via SMS or email to the payment provider. In another embodiment, the user dials a number for the payment provider using the smart phone and conveys the transaction ID through the connection, such as by the user entering the transaction ID through a keypad (e.g., in an interactive voice response (IVR) process) or voice. The user may dial or enter a number or address for the payment provider to effect transmission. In other embodiments, the second device may automatically transmit the transaction ID when it is received, along with user/device information, to the payment provider.

After the payment provider receives the transaction ID and user/device ID from the user second device, the payment provider tries to authenticate the information at step 114. Authentication may include determining whether the received transaction ID corresponds to a valid ID stored with the payment provider. Even if there is a matching transaction ID, the payment provider may further determine information associated with the transactions ID match, such as merchant name, type, and location, for authentication. Authentication may also include matching the user/device information to what is stored with the payment provider. For example, the phone number from the second user device is searched to determine if an account exists corresponding to the phone number. Additional checks may also be made, such as location, purchase information and history, etc. If the payment provider is able to authenticate the transaction based on the received information, the transaction is processed at step 116.

Processing may include transferring the amount of the purchase from the user account to a merchant account. The amount of the purchase and the merchant account may be obtained from the transaction ID, and the user account may be identified from the user/device identification. The payment provider may then send a confirmation to the merchant that payment has been received, so that the merchant can then ship the purchased items. The payment provider may also send a confirmation to the user that payment has been made, such as through the merchant site, where the user sees a visual confirmation on the first user device, or through the second user device, e.g., a text message, email, or audio confirmation.

As a result, a transaction is authenticated by the payment provider instead of the merchant, which may provider higher security due to the secure nature of a payment provider as opposed to a merchant. In addition, because of a paired communication between two user devices, a transaction started on one device can be completed via the second device, without the user having to enter any information (the case where the transaction ID is automatically received by the second device and transmitted to the payment provider), resulting in an easier transaction for the user.

Figure 2:
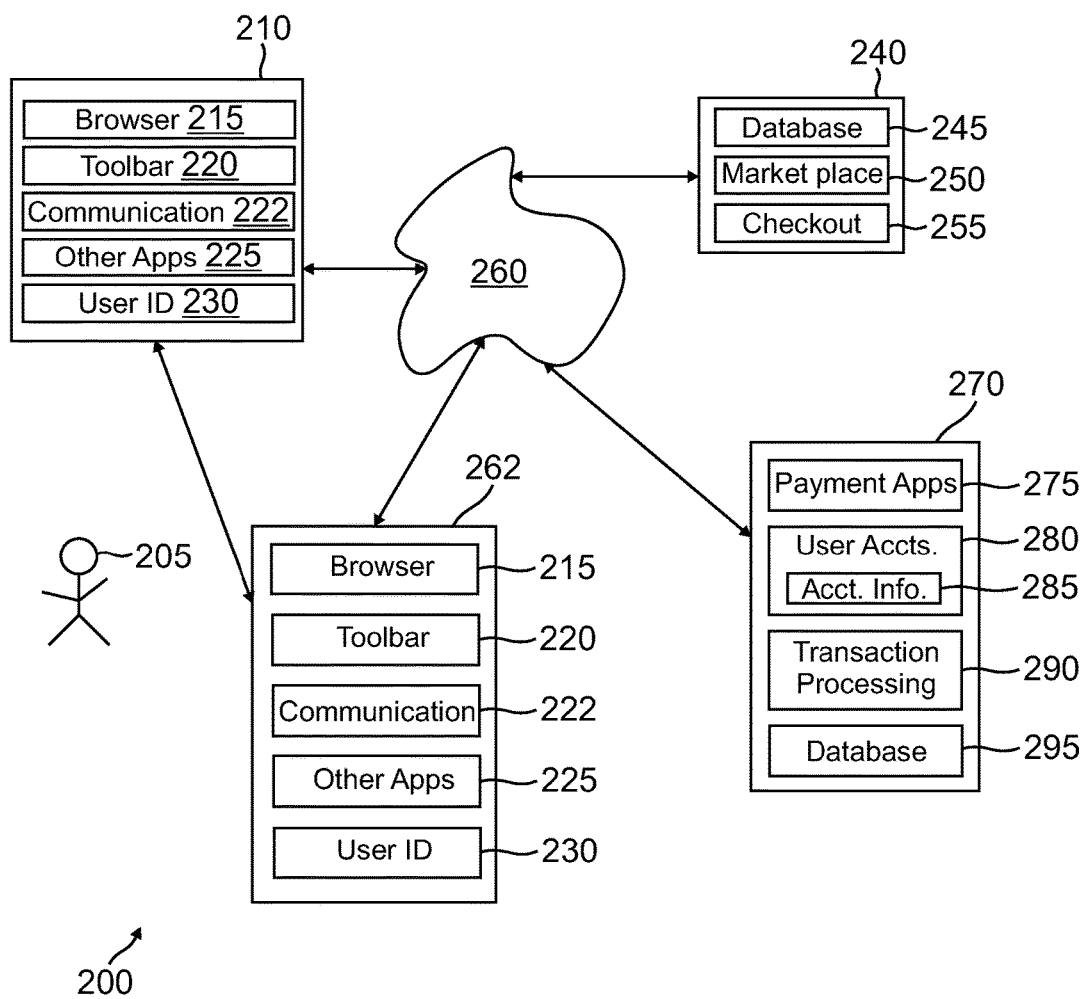
FIG. 2 is a block diagram of a networked system configured to implement the process of FIG. 1 in accordance with an embodiment of the invention.

FIG. 2 is a block diagram of a networked system 200 configured to handle a purchase transaction, such as described above, in accordance with an embodiment of the invention. System 200 includes a first user or consumer device 210, a second user or consumer device 262, a merchant server 240, and a payment service provider server 270 in communication over a network 260. Payment service provider server 270 may be maintained by a payment provider, such as PayPal, Inc. of San Jose, Calif. A user 205, such as a consumer, utilizes both first user device 210 and second user device 262 for performing a transaction with a payment provider.

First user device 210, second user device 262, merchant server 240, and payment service provider server 270 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 200, and/or accessible over network 260.

Network 260 may be implemented as a single network or a combination of multiple networks. For example, in various embodiments, network 260 may include the Internet or one or more intranets, landline networks, wireless networks, and/or other appropriate types of networks.

First user device 210 and second user device 262 may be implemented using any appropriate combination of hardware and/or software configured for wired and/or wireless communication over network 260. For example, in one embodiment, the two user devices may be implemented as a personal computer (PC), a smart phone, personal digital assistant (PDA), laptop computer, and/or other types of computing devices capable of transmitting and/or receiving data. In one embodiment, first user device 210 is a laptop, and second user device is a smart phone.

First user device 210 may include one or more browser applications 215 which may be used, for example, to provide a convenient interface to permit user 205 to browse information available over network 260. For example, in one embodiment, browser application 215 may be implemented as a web browser configured to view information available over the Internet. First user device 210 may also include one or more toolbar applications 220 which may be used, for example, to provide client-side processing for performing desired tasks in response to operations selected by user 205.

In one embodiment, toolbar application 220 may display a user interface in connection with browser application 215 as further described herein.

In addition, first user device 210 may include a communication application 222 that can detect other user devices in close proximity, set up and maintain a communication link with one or more other user devices, receive information from a payment provider, and communicate with the merchant and payment provider. As discussed above, the information may be a transaction ID, which is then communicated to second user device 262.

First user device 210 may further include other applications 225 as may be desired in particular embodiments to provide desired features to first user device 210. For example, other applications 225 may include security applications for implementing client-side security features, programmatic client applications for interfacing with appropriate application programming interfaces (APIs) over network 260, or other types of applications. Applications 225 may also include email and texting applications that allow user 205 to send and receive emails and texts through network 260. First user device 210 includes one or more user identifiers 230 which may be implemented, for example, as operating system registry entries, cookies associated with browser application 215, identifiers associated with hardware of first user device 210, or other appropriate identifiers, such as used for payment/user/device authentication. In one embodiment, user identifier 230 may be used by a payment service provider to associate user 205 with a particular account maintained by the payment service provider as further described herein.

Second user device 262 may have similar applications and modules as first user device 210, but in a smaller housing (i.e., a smart phone compared with a laptop). Second user device 262 may also include one or more browser applications 215 and one or more toolbar applications 220 which may be used, for example, to provide a convenient interface to permit user 205 to browse information and perform tasks over network 260. For example, in one embodiment, browser application 215 may be implemented as a web browser configured to view information available over the Internet in a reduced format or content due to the smaller display on second user device 262. Toolbar applications 220 may be display a reduced number of tabs or links for the user to select, again based on the smaller size of the screen on second user device 262.

Similar to first user device 210, second user device 262 may include a communication application 222 that can detect other user devices in close proximity, set up and maintain a communication link with one or more other user devices, and transmit information, automatically or by user-input, to a payment provider. As discussed above, the information may be a transaction ID, which is communicated to second user device 262, and user/device information, such as a phone number of second user device 262. As such, communication application 222 may also include voice or call functionality to perform actions as described above.

Second user device 262 may further include other applications 225 such as security applications for implementing client-side security features, programmatic client applications for interfacing with appropriate application programming interfaces (APIs) over network 260, or other types of applications. Applications 225 may also include email, text, and voice applications that allow user 205 to communicate through network 260. Second user device 262 includes one or more user identifiers 230 which may be implemented, for example, as operating system registry entries, cookies associated with browser application 215, identifiers associated with hardware of second user device 262, or other appropriate identifiers, such as used for payment/user/device authentication, e.g., the phone number associated with second user device 262. Identifiers may be used by a payment service provider to associate user 205 with a particular account maintained by the payment service provider.

Merchant server 240 may be maintained, for example, by an on-line merchant offering various products and/or services in exchange for payment to be received over network 260. Merchant server 240 includes a database 245 identifying available products and/or services (e.g., collectively referred to as items) which may be made available for viewing and purchase by user 205. Accordingly, merchant server 240 also includes a marketplace application 250 which may be configured to serve information over network 260 to browser 215 of first user device 210. In one embodiment, user 205 may interact with marketplace application 250 through browser applications over network 260 in order to view various products or services identified in database 245.

Merchant server 240 also includes a checkout application 255 which may be configured to facilitate the purchase by user 205 of goods or services identified by marketplace application 250. Checkout application 255 may be configured to accept payment information from user 205 through payment service provider server 270 over network 260. For example, checkout application 255 may receive and process a payment confirmation from payment service provider server 270, as well as transmit transaction information to the payment provider and receive information from the payment provider (e.g., a transaction ID).

Payment service provider server 270 may be maintained, for example, by an online payment service provider which may provide payment on behalf of user 205 to the operator of merchant server 240. In this regard, payment service provider server 270 includes one or more payment applications 275 which may be configured to interact with first user device 210, second user device 262, and/or merchant server 240 over network 260 to facilitate the purchase of goods or services by user 205 of first user device 210 and second user device 262.

Payment service provider server 270 also maintains a plurality of user accounts 280, each of which may include account information 285 associated with individual users. For example, account information 285 may include private financial information of users of devices such as account numbers, passwords, device identifiers, user names, phone numbers, credit card information, bank information, or other financial information which may be used to facilitate online transactions by user 205. Advantageously, payment application 275 may be configured to interact with merchant server 240 on behalf of user 205 during a transaction with checkout application 255 to track and manage purchases made by users.

A transaction processing application 290, which may be part of payment application 275 or separate, may be configured to receive information from a user device and/or merchant server 240 for processing and storage in a payment database 295. Transaction processing application 290 may include an application to generate unique transaction IDs based on information received from first user device 210 and/or merchant server 240. This information may include items selected for purchase, cost of each item, tax, shipping, merchant information, and/or user information. Payment application 275 may be further configured to match data received from second user device 262 with information stored in payment database 295 for payment authentication and processing. As discussed, this data may include a user or device ID and the transaction ID.

Figure 3:
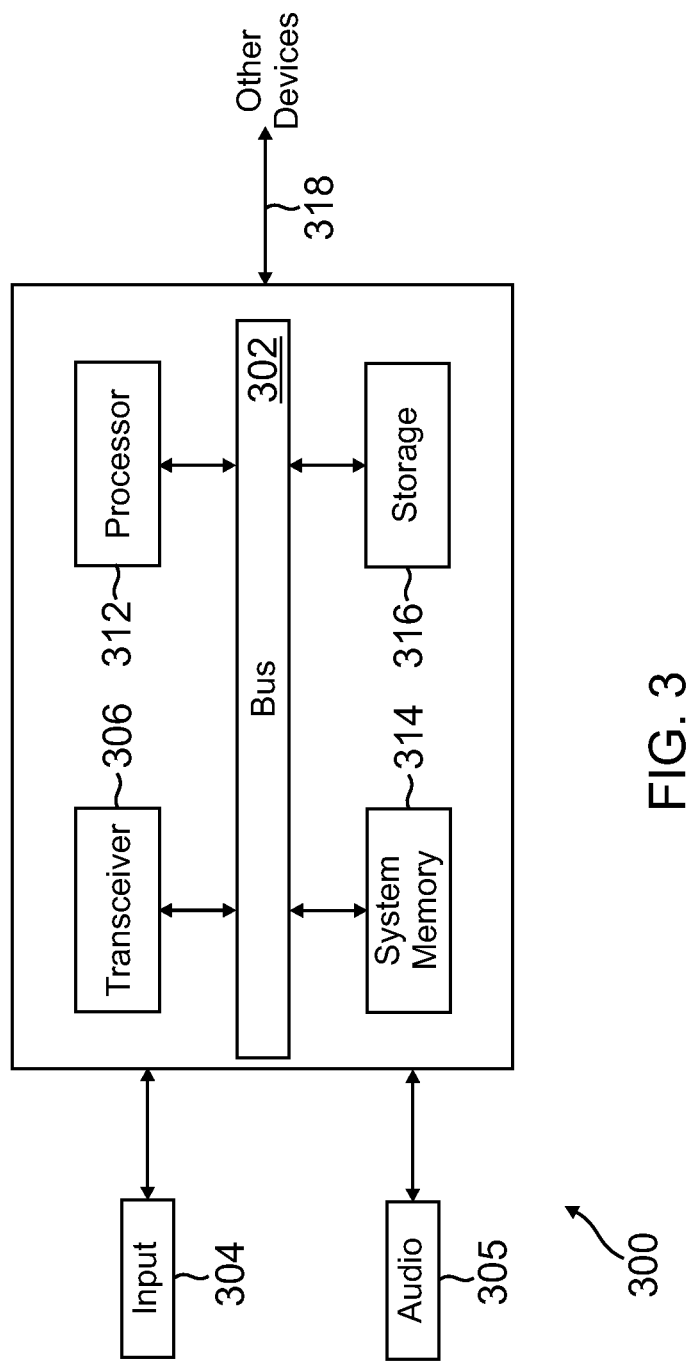
FIG. 3 is a block diagram of a computer system suitable for implementing one or more components in FIG. 2 according to one embodiment of the present disclosure.

FIG. 3 is a block diagram of a computer system 300 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 300 in a manner as follows.

Computer system 300 includes a bus 302 or other communication mechanism for communicating information data, signals, and information between various components of computer system 300. Components include an input/output (I/O) component 304 that processes a user action, such as selecting keys from a keypad/keyboard, selecting one or more buttons or links, etc., and sends a corresponding signal to bus 302. I/O component 304 may also include an output component, such as a display. An optional audio input/output component 305 may also be included to allow a user to use voice for inputting information by converting audio signals. Audio I/O component 305 may allow the user to hear audio. A transceiver 306 transmits and receives signals between computer system 300 and other devices, such as another user device, a merchant server, or a payment provider server. In one embodiment, the transmission is wireless, although other transmission mediums and methods may also be suitable. A processor 312, which can be a micro-controller, digital signal processor (DSP), or other processing component, processes these various signals, such as for display on computer system 300 or transmission to other devices via a communication link 318, including setting up and maintaining communication with another user device and/or discovering other user devices. Processor 312 may also control transmission of information, such as the transaction ID, to other devices.

Components of computer system 300 also include a system memory component 314 (e.g., RAM) and a static storage component 316 (e.g., ROM). Computer system 300 performs specific operations by processor 312 and other components by executing one or more sequences of instructions contained in system memory component 314. Logic may be encoded in a computer readable medium, which may refer to any medium that participates in providing instructions to processor 312 for execution. Such a medium may take many forms, including but not limited to, non-volatile media, volatile media, and transmission media. In various implementations, non-volatile media includes optical or magnetic disks, volatile media includes dynamic memory, such as system memory component 314, and transmission media includes coaxial cables, copper wire, and fiber optics, including wires that comprise bus 302. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the present disclosure, execution of instruction sequences to practice the present disclosure may be performed by computer system 300. In various other embodiments of the present disclosure, a plurality of computer systems 300 coupled by communication link 318 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, one embodiment described above is for the user to initiate a transaction through a PC or laptop and then have a smart phone convey the transaction ID and user/device information to the payment provider. However, this can be reversed in that the user first initiates the transaction through the smart phone or other mobile device and then a PC, laptop, or other device communicates the transaction ID and user/device information to the payment provider. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method of performing on-line transactions, comprising:

generating, by a processor of a payment provider, a transaction identifier (ID) based on information received from a first user device for a transaction that is initiated by a user without the user entering authentication information of the user, the authentication information including a password, wherein the transaction ID is generated without the authentication information of the user;

transmitting the transaction ID to the first user device;

receiving the transaction ID from a second user device that is electronically coupled to the first user device via one of the following protocols: Bluetooth, Radio Frequency (RF), Infrared (IR), microwave, Near Field Communication (NFC), RF identification (RFID), or Ultra Wideband, wherein the transaction ID is automatically communicated electronically from the first user device to the second user device, in response to an electronic discovery or electronic pairing process between the first user device and the second user device;

receiving, from the second user device, user identification information that identifies an account of the user with the payment provider;

after the receiving of the transaction ID and the user identification information, initially authenticating, by the processor of the payment provider and without manually-entered user authentication information, the user for the transaction, wherein the initially authenticating comprises:

locating the account of the user by matching the received user identification information with stored user identification information of a plurality of users;

locating the transaction based on the received transaction ID; and granting, to the first user device or the second user device, access to the account of the user in response to the locating of the account of the user and the locating of the transaction; and processing the transaction in response to the initially authenticating.

2. The method of claim 1, wherein the user identification information is automatically communicated to the payment provider without requiring user input.

3. The method of claim 1, wherein the user identification information includes a phone number or an email address of the user that is associated with the account of the user with the payment provider.

4. The method of claim 1, wherein the transaction ID comprises information about a merchant of the transaction, an item to be purchased as part of the transaction, and a price of the transaction.

5. The method of claim 1, wherein the transaction ID and the user identification information are received in a same communication.

6. The method of claim 1, wherein the transaction ID is received via text, voice, or interactive voice response (IVR).

7. The method of claim 1, wherein the transaction ID is generated without the user having to manually enter any personal identification information.

8. The method of claim 1, wherein the first user device is a laptop or personal computer and the second user device is a smart phone.

9. A non-transitory machine-readable medium having stored thereon machine-readable instructions executable to cause a machine to perform operations comprising:

generating a transaction identifier (ID) based on information received from a first user device for a transaction that is initiated by a user without the user entering authentication information of the user, the authentication information including a password, wherein the transaction ID is generated without the authentication information of the user;

transmitting the transaction ID to the first user device;

receiving the transaction ID from a second user device that is electronically coupled to the first user device via one of the following protocols: Bluetooth, Radio Frequency (RF), Infrared (IR), microwave, Near Field Communication (NFC), RF identification (RFID), or Ultra Wideband, wherein the transaction ID is automatically communicated electronically from the first user device to the second user device, in response to an electronic discovery or electronic pairing process between the first user device and the second user device;

receiving, from the second user device, user identification information that identifies an account of the user with a payment provider;

performing, after the transaction ID and the user identification information have been received, an initial authentication of the user for the transaction without manually-entered user authentication information, wherein the performing the initial authentication comprises:

locating the account of the user by matching the received user identification information with stored user identification information of a plurality of users;

locating the transaction based on the received transaction ID; and granting, to the first user device or the second user device, access to the account of the user in response to the locating of the account of the user and the locating of the transaction; and processing the transaction in response to the initial authentication.

10. The non-transitory machine-readable medium of claim 9, wherein the transaction ID and the user identification information are automatically communicated, without requiring user input, to a machine of the payment provider on which the transaction ID is stored.

11. The non-transitory machine-readable medium of claim 9, wherein the transaction ID and the user identification information are received in a same communication.

12. The non-transitory machine-readable medium of claim 9, wherein the transaction ID is received via text, voice, or interactive voice response (IVR).

13. The non-transitory machine-readable medium of claim 9, wherein the transaction ID is generated without the user having to enter any personal identification information.

14. An on-line payment processing system comprising:

a non-transitory memory; and one or more hardware processors coupled to the non-transitory memory and configured to read instructions from the non-transitory memory to cause the on-line payment processing system to perform operations comprising:

generating a transaction identifier (ID) based on information received from a first user device for a transaction that is initiated by a user without the user entering personal information or authentication information of the user, the authentication information including a password, wherein the transaction ID is generated without the personal information or authentication information of the user;

transmitting the transaction ID to the first user device;

receiving the transaction ID from a second user device that is electronically coupled to the first user device via one of the following protocols: Bluetooth, Radio Frequency (RF), Infrared (IR), microwave, Near Field Communication (NFC), RF identification (RFID), or Ultra Wideband, wherein the transaction ID is automatically communicated electronically from the first user device to the second user device, in response to an electronic discovery or electronic pairing process between the first user device and the second user device;

receiving, from the second user device, user identification information that identifies an account of the user with the on-line payment processing system;

after the transaction ID and the user identification information have been received, initially authenticating the user without manually-entered user authentication information, wherein the initially authenticating comprises:

locating the account of the user by matching the received user identification information with stored user identification information of a plurality of users;

locating the transaction based on the received transaction ID; and granting, to the first user device or the second user device, access to the account of the user in response to the locating of the account of the user and the locating of the transaction; and processing the transaction in response to the initially authenticating.

15. The system of claim 14, wherein the transaction ID and the user identification information are automatically communicated, without requiring user input, to a machine of the on-line payment processing system.

16. The system of claim 14, wherein the user identification information comprise a phone number or an email address of the user.

17. The system of claim 14, wherein the transaction ID comprises information about a merchant of the transaction, an item to be purchased as part of the transaction, and a price of the transaction.

18. The system of claim 14, wherein the transaction ID and the user identification information are received in a same communication.

* * * * *